(12) United States Patent
Takemoto et al.

(10) Patent No.: US 10,731,779 B2
(45) Date of Patent: Aug. 4, 2020

(54) COLUMN-ATTACHING DEVICE AND FERRULE SET

(71) Applicant: Shimadzu Corporation, Kyoto (JP)

(72) Inventors: Hajime Takemoto, Kyoto (JP); Akiko Bamba, Kyoto (JP); Hirokazu Taniuchi, Kyoto (JP); Yoshihiko Ide, Kyoto (JP); Hideyuki Moritani, Kyoto (JP); Ryo Takechi, Kyoto (JP)

(73) Assignee: Shimadzu Corporation, Nishinokyo-Kuwabaracho, Nakagyo-ku, Kyoto-shi, Kyoto (JP)

(*) Notice: Subject to any disclaimer, the term of this patent is extended or adjusted under 35 U.S.C. 154(b) by 317 days.

(21) Appl. No.: 15/312,764

(22) PCT Filed: May 22, 2014

(86) PCT No.: PCT/JP2014/063566
§ 371 (c)(1),
(2) Date: Nov. 21, 2016

(87) PCT Pub. No.: WO2015/177901
PCT Pub. Date: Nov. 26, 2015

(65) Prior Publication Data
US 2017/0184225 A1 Jun. 29, 2017

(51) Int. Cl.
*F16L 25/06* (2006.01)
*F16L 7/02* (2006.01)
(Continued)

(52) U.S. Cl.
CPC ............ *F16L 7/02* (2013.01); *F16L 25/06* (2013.01); *G01N 30/6026* (2013.01); *G01N 30/6004* (2013.01); *G01N 2030/025* (2013.01)

(58) Field of Classification Search
CPC ....... F16L 19/06; F16L 19/063; F16L 19/065; F16L 37/248; F16L 37/252; F16L 37/107
(Continued)

(56) References Cited

U.S. PATENT DOCUMENTS 4,991,883 A 2/1991 Worden
5,163,722 A * 11/1992 Worden ................ F16L 37/242
285/101
(Continued)

FOREIGN PATENT DOCUMENTS

JP 50-126289 10/1975
JP 56-017934 2/1981
(Continued)

OTHER PUBLICATIONS

Office Action dated Feb. 27, 2018 for corresponding patent application JP 2016-520873.
(Continued)

*Primary Examiner* — Aaron M Dunwoody
(74) *Attorney, Agent, or Firm* — Muir Patent Law, PLLC

(57) ABSTRACT

In a state in which a ferrule 10 is sandwiched and fixed between a ferrule receiving part 20 and a ferrule pressing part 30, the ferrule 10 is urged toward the ferrule receiving part 20 side by an urging member 33. With this structure, without configuring such that the ferrule pressing part is screwed in the ferrule receiving part by rotating several times, the ferrule 10 can be pressed toward the ferrule receiving part 20 side by a sufficient pressing force by the urging force of the urging member 33. Therefore, the attaching work of the column 2 can be performed more easily.

4 Claims, 9 Drawing Sheets

(51) Int. Cl.
*G01N 30/60* (2006.01)
*G01N 30/02* (2006.01)

(58) Field of Classification Search
USPC .................................. 285/342, 396, 361
See application file for complete search history.

(56) References Cited

U.S. PATENT DOCUMENTS

| | | | | |
|---|---|---|---|---|
| 5,234,235 | A * | 8/1993 | Worden | F16L 29/04 |
| | | | | 285/334.4 |
| 6,095,572 | A * | 8/2000 | Ford | F16L 37/248 |
| | | | | 210/198.2 |
| 6,102,449 | A * | 8/2000 | Welsh | F16L 19/07 |
| | | | | 285/332 |
| 8,128,131 | B2 | 3/2012 | Barnett et al. | |
| 10,099,221 | B2 * | 10/2018 | Taniuchi | B01D 53/025 |
| 10,119,638 | B2 * | 11/2018 | Pa | F16L 49/06 |
| 2003/0151252 | A1 | 8/2003 | Dole | |
| 2006/0113794 | A1 | 6/2006 | Plant et al. | |
| 2010/0133806 | A1 | 6/2010 | Barnett et al. | |
| 2011/0303593 | A1 * | 12/2011 | Reinhardt | F16L 19/061 |
| | | | | 210/143 |
| 2012/0223520 | A1 | 9/2012 | Graham | |
| 2015/0285414 | A1 * | 10/2015 | Tomida | G01N 30/6039 |
| | | | | 285/389 |
| 2018/0252052 | A1 * | 9/2018 | Attiwell | E21B 17/042 |

FOREIGN PATENT DOCUMENTS

| | | |
|---|---|---|
| JP | 2002-267597 | 9/2002 |
| WO | WO 2013/113386 | 8/2013 |

OTHER PUBLICATIONS

Office Action from the Chinese Patent Office dated Sep. 11, 2017 for corresponding patent application 201480079100.6.
International Search Report of PCT/JP2014/063566, dated Aug. 26, 2014.

* cited by examiner

COLUMN-ATTACHING DEVICE AND FERRULE SET

TECHNICAL FIELD

The present invention relates to a column-attaching device for attaching a column to an attachment position, and also to a ferrule set used for the column-attaching device.

BACKGROUND ART

In a gas chromatograph, a carrier gas is introduced into a column from a sample introduction part together with a sample, and each sample component is separated in a process that the carrier gas passes in the column. Each sample component separated in the column is detected by a detector connected to the column. The connection of the column to a sample introduction part or a detector can be performed via a column-attaching device.

The column-attaching device is provided with, for example, a ferrule, a ferrule receiving part, and a ferrule pressing part. The ferrule is attached to the column by being swaged in a state in which the column is inserted. And, by fixing the ferrule attached to the column by sandwiching between the ferrule receiving part and the ferrule pressing part, the column can be attached to the column-attaching device (see, for example, the following Patent Document 1).

In a conventional column-attaching device as exemplified by Patent Document 1, a ferrule pressing part is screwed in the ferrule receiving part to be attached thereto. Concretely, screw threads are formed on the inner peripheral surface of the cylindrical ferrule receiving part, and screw grooves are formed on the exterior peripheral surface of the tip end part of the ferrule pressing part to be screwed in the ferrule receiving part.

As for ferrules, ferrules different in shape are used depending on the outer diameter of a column to be inserted into a ferrule. Therefore, depending on the shape of ferrule to be used, the screwing amount of a ferrule pressing part to the ferrule receiving part changes. For this reason, on the inner peripheral surface of the ferrule receiving part, screw threads are formed in a relatively wide range, and by screwing the ferrule pressing part to an appropriate position depending on the shape of the ferrule, it is possible to press the ferrule toward the ferrule receiving part with a sufficient pressing force for securing a sealing performance.

PRIOR ART DOCUMENT

Patent Document

Patent Document 1: U.S. Pat. No. 8,128,131

SUMMARY OF THE INVENTION

Problems to be Solved by the Invention

However, in the aforementioned screw type column-attaching device, the screw threads are formed in a relatively wide range of the inner peripheral surface of the ferrule receiving part. For this reason, it was required for an operator to rotate the ferrule pressing part several times to be screwed in the ferrule receiving part. Therefore, an operator cannot attach the ferrule pressing part to the ferrule receiving part by one-touch operation, and therefore it cannot be said that the attaching work of a column to the column-attaching device is easy.

Further, in the aforementioned screw type column-attaching device, it is hard for an operator to grasp how many turns the ferrule pressing art should be rotated. For this reason, there are problems that the attaching work of the column to the column-attaching device is more difficult and variation of the pressing force to the ferrule is likely to occur often.

The present invention was made in view of the aforementioned circumstances, and aims to provide a column-attaching device and a ferrule set capable of more easily performing an attaching work of a column. Further, the present invention aims to provide a column-attaching device and a ferrule set that is less likely to occur variation of a pressing force to a ferrule.

Means for Solving the Problems

A column-attaching device according to the present invention is a column-attaching device for attaching a column to an attachment position, and is provided with a ferrule, a ferrule receiving part, and a ferrule pressing part. The ferrule is attached to the column by being inserted by the column and swaged at one end part side of the ferrule. The ferrule receiving part receives one end part side of the ferrule. The ferrule pressing part is attached to the ferrule receiving part and fixes the ferrule by sandwiching the ferrule between the ferrule pressing part and the ferrule receiving part by pressing the ferrule from the other end part side of the ferrule toward the ferrule receiving part side. The ferrule pressing part includes an urging member for urging the ferrule toward the ferrule receiving part side.

With this structure, in a state in which a ferrule is sandwiched and fixed between a ferrule receiving part and a ferrule pressing part, the ferrule is urged toward the ferrule receiving part side by the urging member. Therefore, without configuring such that the ferrule pressing part is screwed in the ferrule receiving part by rotating several times, the ferrule can be pressed toward the ferrule receiving part side by a sufficient pressing force with the urging force of the urging member. Therefore, the attaching work of the column can be performed more easily.

Further, by configuring such that the ferrule is urged toward the ferrule receiving part side by an urging member, the installation error of the ferrule pressing part to the ferrule receiving part can be absorbed by the urging member. Therefore, variation of the pressing force to the ferrule is less likely to occur.

Another column-attaching device according to the present invention is a device for attaching a column to an attachment position, and is provided with a ferrule, a ferrule receiving part, and a ferrule pressing part. The ferrule is attached to the column by being inserted by the column and swaged at one end part side of the ferrule. The ferrule receiving part receives one end part side of the ferrule. The ferrule pressing part is attached to the ferrule receiving part and fixes the ferrule by sandwiching the ferrule between the ferrule pressing part and the ferrule receiving part by pressing the ferrule from the other end part side of the ferrule toward the ferrule receiving part side. The ferrule receiving part and the ferrule pressing part are fixed with each other by an engagement of a pin provided at one of the ferrule receiving part and the ferrule pressing part and a guide groove provided at the other of the ferrule receiving part and the ferrule pressing part.

According to this configuration, due to the engagement of the pin and the guide groove, the ferrule receiving part and the ferrule pressing part are mutually attached, and the ferrule can be fixed by sandwiching the ferrule between the ferrule receiving part and the ferrule pressing part. Therefore, without configuring such that the ferrule pressing part is screwed in the ferrule receiving part by rotating several times, the ferrule pressing part can be attached to the ferrule receiving part by one-touch operation by simply guiding the pin along the guide groove. Therefore, the attaching work of the column can be performed more easily.

Further, like the aforementioned screw type column-attaching device, it is not hard for an operator to grasp how many turns the ferrule pressing part should be rotated. For this reason, the attaching work of the column to the column-attaching device is more easy and variation of the pressing force to the ferrule is less likely to occur.

The guide groove may include an inclined groove that extends in a direction inclined to a pressing direction of the ferrule pressing part toward the ferrule receiving part so as to guide the pin.

According to this configuration, by simply guiding the pin along the inclined groove extending in a direction inclined to the pressing direction of the ferrule pressing part, the ferrule pressing part can be attached to the ferrule receiving part by one-touch operation. At this time, by guiding the pin along the inclined groove, the ferrule can be gradually pressed toward the ferrule receiving part side. Therefore, by appropriately setting the inclination angle of the inclined groove, the operability at the time of attachment can be improved.

The guide groove may include an engaging groove for engaging the pin to be guided along the inclined groove.

According to the configuration, by guiding the pin along the inclined groove to gradually press the ferrule toward the ferrule receiving part side and then engaging the pin with the engaging groove, the ferrule can be fixed with a constant pressing force. Therefore, variation of the pressing force to the ferrule is less likely to occur and an operator can get a clicking feeling when the pin is engaged with the engaging groove, which can improve the operability at the time of the attachment.

Another column-attaching device according to the present invention is a device for attaching a column to an attachment position, and is provided with a ferrule, a ferrule receiving part, and a ferrule pressing part. The ferrule is attached to the column by being inserted by the column and swaged at one end part side of the ferrule. The ferrule receiving part receives one end part side of the ferrule. The ferrule pressing part is attached to the ferrule receiving part and fixes the ferrule by sandwiching the ferrule between the ferrule pressing part and the ferrule receiving part by pressing the ferrule from the other end part side toward the ferrule receiving part side. The ferrule receiving part and the ferrule pressing part are fixed with each other when a cam provided at least one of the ferrule receiving part and the ferrule pressing part is rotated.

According to this configuration, due to the rotation of the cam, the ferrule receiving part and the ferrule pressing part are mutually attached, so that the ferrule can be fixed by sandwiching the ferrule between the ferrule receiving part and the ferrule pressing part. Therefore, without configuring such that the ferrule pressing part is screwed in the ferrule receiving part by rotating several times, the ferrule pressing part can be attached to the ferrule receiving part by one-touch operation by simply rotating the cam. Therefore, the attaching work of the column can be performed more easily. At this time, by rotating the cam, the ferrule can be gradually pressed toward the ferrule receiving part side. Therefore, by appropriately setting the surface shape of the cam, the operability at the time of attachment can be improved.

Further, like the aforementioned screw type column-attaching device, it is not hard for an operator to grasp how many turns the ferrule pressing part should be rotated. For this reason, the attaching work of the column to the column-attaching device is more easy and variation of the pressing force to the ferrule is less likely to occur.

It is preferable that the ferrule pressing part include an urging member for urging the ferrule toward the ferrule receiving part side.

With this configuration, even if it is configured such that the ferrule pressing part can be attached to the ferrule receiving part by one-touch operation, the ferrule can be pressed toward the ferrule receiving part side by a sufficient pressing force by the urging force of the urging member. Further, by configuring such that the ferrule is urged toward the ferrule receiving part side with the urging member, the installation error of the ferrule pressing part to the ferrule receiving part can be absorbed by the urging member. Therefore, variation of the pressing force to the ferrule is less likely to occur.

It is preferable that the ferrule receiving part receive the ferrule at a position different from a swaged position of the ferrule.

According to this configuration, the ferrule is pressed toward the ferrule receiving part by the ferrule pressing part in a state in which the ferrule is received by the ferrule receiving part at a position different from the swaged position. The swaged position of the ferrule is unstable in shape, and therefore, by receiving the ferrule by the ferrule receiving part at a position different from the swaged position, variation of the pressing force to the ferrule is less likely to occur.

The ferrule set according to the present invention is a ferrule set including plural types of ferrules for use in the column-attaching device, and each of the ferrules is provided with a receiving side contact portion received by the ferrule receiving part and a pressing side contact portion pressed by the ferrule pressing part. The distance between the receiving side contact portion and the pressing side contact portion is the same in each ferrule.

According this configuration, in any of the multiple types of ferrules, since the distance between the receiving side contact portion and the pressing side contact portion is the same. Therefore, even in cases where any one of the ferrules is sandwiched and fixed between the ferrule receiving part and the ferrule pressing part, the ferrule can be fixed by a constant pressing force. Therefore, variation of the pressing force to the ferrule is less likely to occur.

Each of the ferrules may be provided with an insertion hole having an inner diameter corresponding to an outer diameter of a column to be inserted and extending along a center axis line and a first tapered surface inclined to the center axis line and having the receiving side contact portion. In this case, it is preferable that the inclination angle of the first tapered surface to the center axis line be the same in each ferrule and a length of the first tapered surface in a center axis line direction differ depending on the outer diameter of the column to be inserted in each ferrule.

According to this configuration, since the inclination angle of the first tapered surface to the center axis line is the same in each ferrule, when the length of the first tapered surface in a center axis line direction differs depending on the outer diameter of the column, the shape of the tip end part of the first tapered surface differs in each ferrule. If the thickness of the tip end part of the ferrule and the gap between the column and the ferrule are constant regardless of the outer diameter of the column to be used, a ferrule can be attached to a column by swaging the ferrule with the same torque. As a result, the attaching work of the column can be performed more easily.

In each ferrule, a second tapered surface larger in inclination angle to the center axis line than the first tapered surface may be formed at at least a part between the receiving side contact portion and the pressing side contact portion.

According to the configuration, by providing the second tapered surface having the inclination angle larger than the inclination angle of the first tapered surface while setting the inclination angle of the first tapered surface to an angle suitable for swaging, the length of the ferrule along the center axis line can be made shorter. Further, at the time of sandwiching each ferrule between the ferrule receiving part and the ferrule pressing part, by making the second tapered surface act as a guide, each ferrule can be smoothly arranged at the attachment position, which enables to perform an attaching work of the column more easily.

Each ferrule may have an end face configuring the pressing side contact portion. In this case, it is preferable that a conically-shaped dent be formed at the end face part so as to expand to be larger than an outer diameter of a column to be inserted and the column be inserted into each of the ferrules via the dent.

According to this configuration, at the time of inserting a column into each ferrule, the column can be inserted into each column via the conically-shaped dent formed at the end face of each ferrule. With this, since the column can be smoothly guided into each ferrule, the attaching work of the column can be performed more easily.

Effects of the Invention

According to the present invention, since it is not configured such that the ferrule pressing part is screwed in the ferrule receiving part by rotating the ferrule pressing part several times, the attaching work of a column can be performed more easily. Further, according to the present invention, variation of the pressing force to the ferrule is less likely to occur.

EMBODIMENTS FOR CARRYING OUT THE INVENTION

Figure 1:
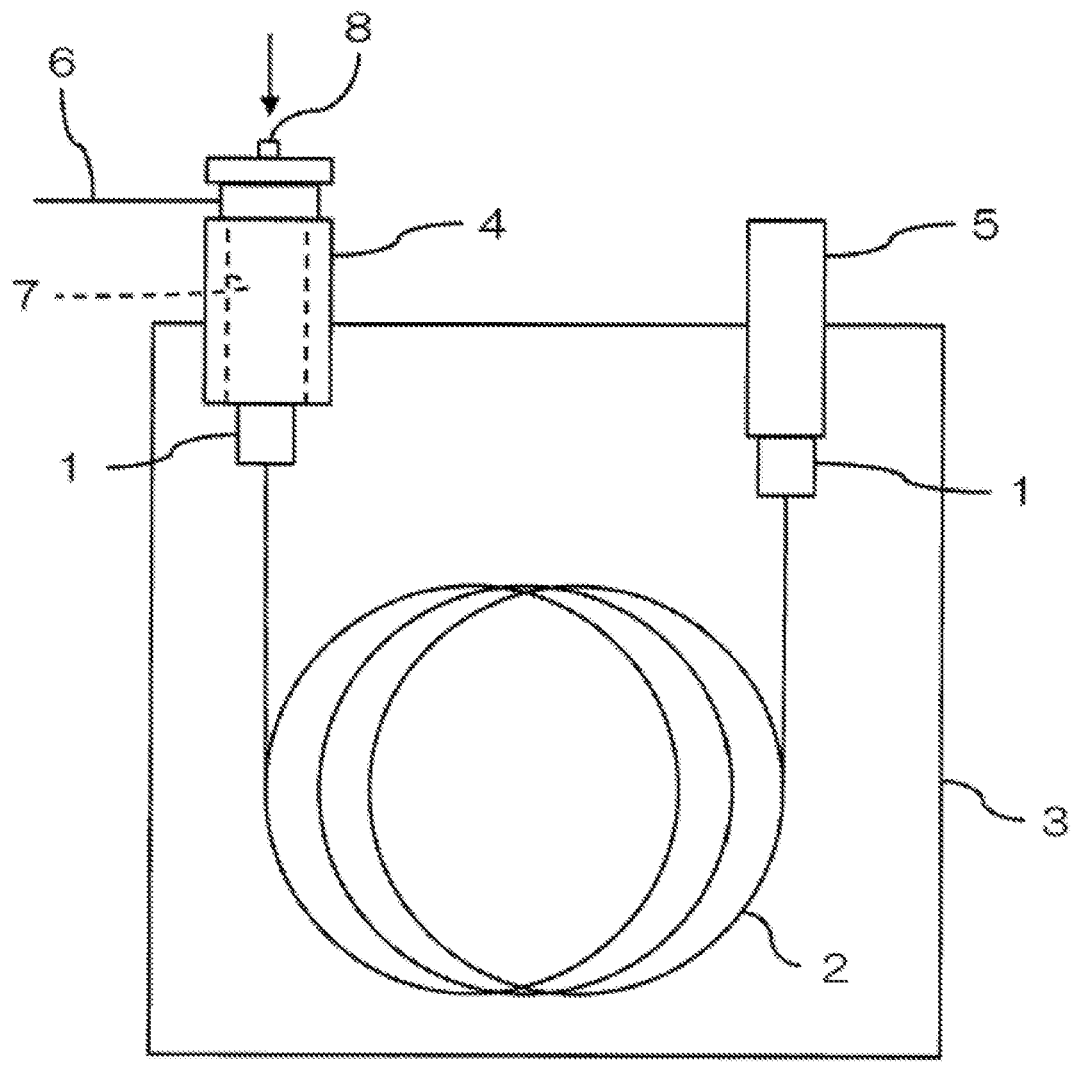
FIG. 1 is a schematic view showing a configuration example of a gas chromatograph to which a column-attaching device according to a first embodiment of the present invention is applied.

FIG. 1 is a schematic view showing a configuration example of a gas chromatograph to which a column-attaching device according to a first embodiment of the present invention is applied. This gas chromatograph is used for performing an analysis by supplying a carrier gas together with a sample to the inside of the column 2, and is equipped with, in addition to the aforementioned column-attaching device 1 and the column 2, a column oven 3, a sample introduction part 4, a detector 5, etc.

The column 2 is made of, for example, a capillary column, and is heated in the column oven 3 during the analysis. The carrier gas is supplied to the inside of the column 2 from the sample introduction part 4 together with a sample. Each sample component is separated in the course of passing through the column 2 and detected by a detector 5 connected to the column 2. The detector 5 can be configured by various detectors, such as, e.g., a hydrogen flame ionization detector (FID).

The sample introduction part 4 is used to introduce a sample to the inside of the column 2 together with a carrier gas supplied from the carrier gas supply path 6. A liquid sample is introduced to the sample vaporization chamber 7 from the sample inlet 8, and the sample vaporized in the sample vaporization chamber 7 is introduced to the inside of the column 2 together with the carrier gas.

The column-attaching device 1 connects one end portion of the column 2 to the sample introduction part 4, and also connects the other end portion of the column 2 to the detector 5. In this embodiment, the following description will be directed to the case in which the column-attaching device 1 that connects one end portion of the column 2 to the sample introduction part 4 and the column-attaching device 1 that connects the other end portion of the column 2 to the detector 5 are the same in structure. However, they may be different in structure.

Figure 2:
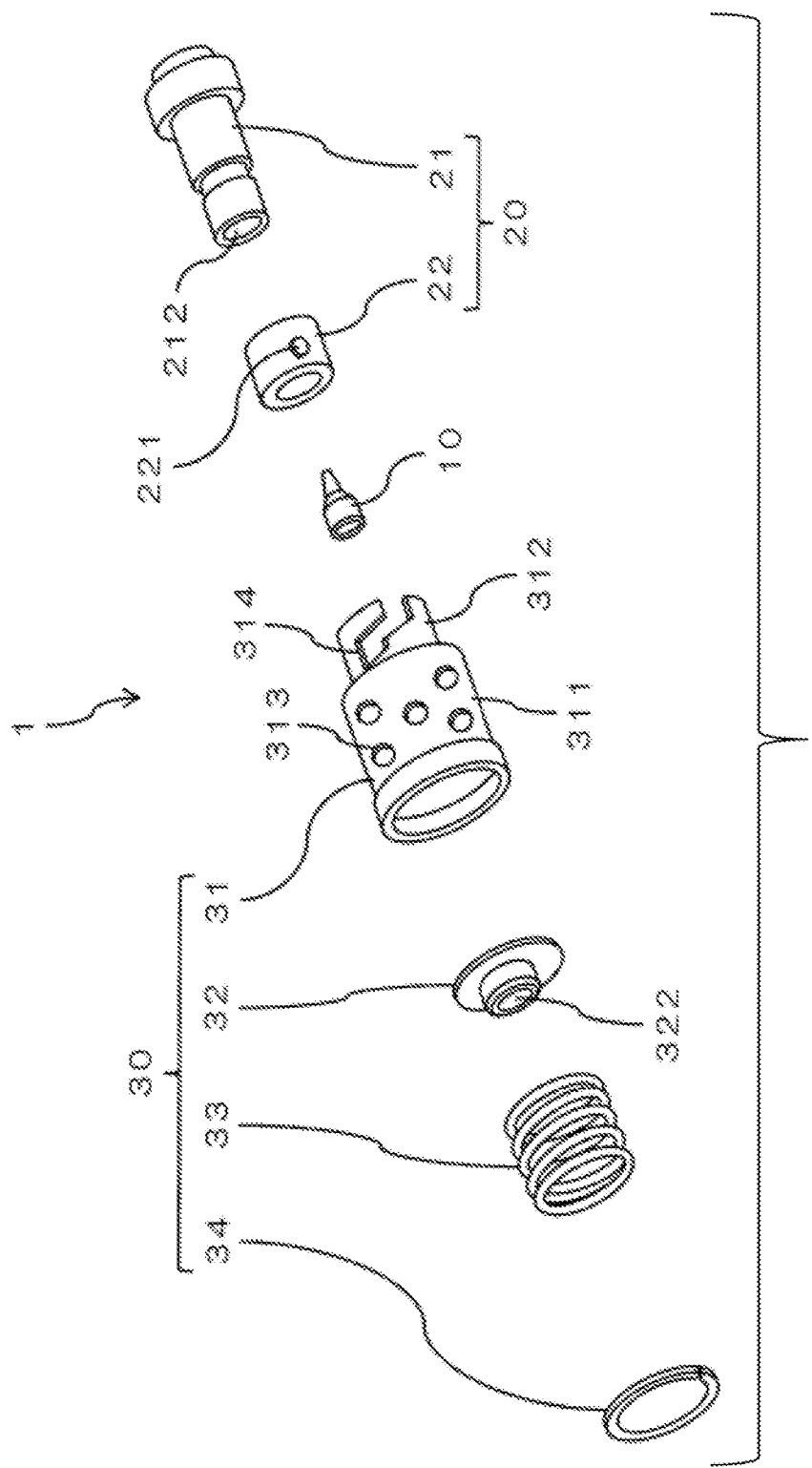
FIG. 2 is an exploded perspective view showing a configuration example of the column-attaching device.
Figure 3:
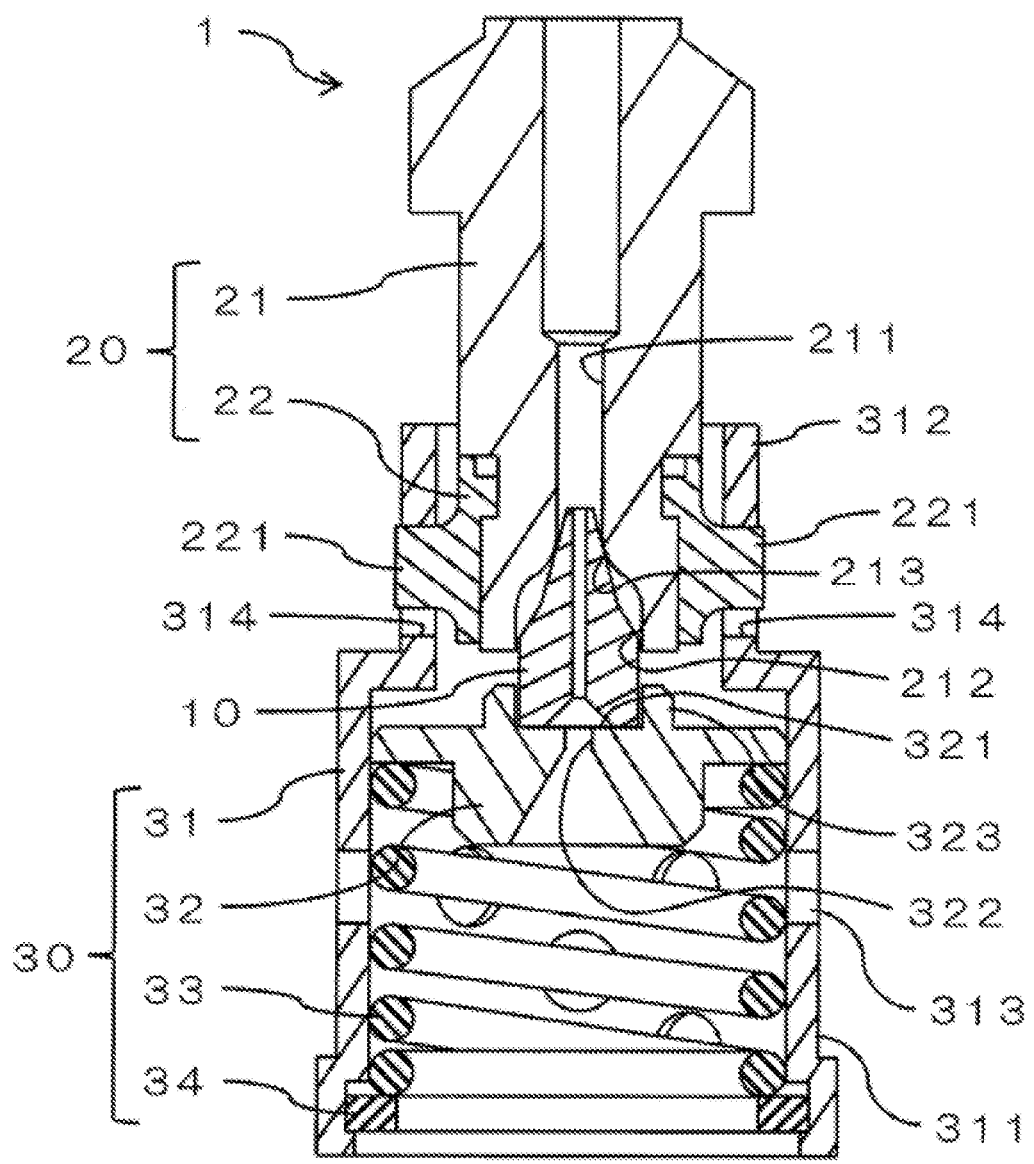
FIG. 3 is a cross-sectional view of the column-attaching device.

FIG. 2 is an exploded perspective view showing a configuration example of the column-attaching device 1. Further, FIG. 3 is a cross-sectional view of the column-attaching device 1. The column-attaching device 1 is a device for attaching a column 2 to an attachment position of the sample introduction part 4, the detector 5, etc., and is equipped with a ferrule 10, a ferrule receiving part 20, and a ferrule pressing part 30.

The ferrule 10 is a cylindrical member in which one end part side thereof is formed into a tapered shape, and a column 2 is inserted to the inside of the ferrule 10. As the ferrule 10, for example, a metallic ferrule is used, but not limited to it. The ferrule 10 may be made of resin, etc. The ferrule 10 is attached to the column 2 by being swaged at one end part side in a state in which a column 2 is inserted to the inside of the ferrule 10. In this disclosure, the wording "swage" denotes a work for plastically deforming the ferrule 10 by applying a pressure to thereby attach the ferrule 10 to the column 2, and is a work performed as provisional tightening before final tightening which is a work for attaching the column 2 to the attachment position.

The ferrule receiving part 20 receives one end part side of the ferrule 10 at the time of final tightening. The ferrule receiving part 20 is provided with, e.g., a receiving side body 21 and a connecting portion 22. The receiving side body 21 is a cylindrical member having a through-hole 211 formed therein. Final tightening is performed such that one end portion of the receiving side body 21 is fixed to the attachment position and the ferrule 10 is pressed against the other end portion of the receiving side body 21.

At the other end face of the receiving side body 21, an accommodation recess 212 is formed to accommodate the ferrule 10. The accommodation recess 212 has an inner diameter slightly larger than the outer diameter of the other end part side of the ferrule 10, and the ferrule 10 to be inserted to the inside of the accommodation recess 212 from the tapered one end part side thereof is positioned in a state in which the ferrule 10 is accommodated in the accommodation recess 212 so that the other end part side thereof is accommodated therein.

The accommodation recess 212 has a narrowed bottom portion, and is communicated with the through-hole 211 via a stepped portion 213. One end part side of the ferrule 10 accommodated in the accommodation recess 212 is brought into close contact with the aforementioned stepped portion 213, so that the airtightness to the ferrule 10 at the stepped portion 213 can be secured by the pressing force at the time of final tightening. In this embodiment, since the stepped portion 213 is formed into a curved surface, the pressing force applied at the time of final tightening is dispersed, which can prevent an excessive pressing force from being applied to the column 2.

The connecting portion 22 is a cylindrical member fitted on the outer peripheral surface of the other end portion of the receiving side body 21, and is configured to connect the ferrule pressing part 30 to the ferrule receiving part 20. On the outer peripheral surface of the connecting portion 22, a pair of columnar shaped pins 221 protruded in the radial direction of the connecting portion 22 are formed. The pair of pins 221 are arranged symmetrically on both sides sandwiching the center axis line of the connecting portion 22. It should be noted, however, that the connecting portion 22 is not limited to the configuration in which the connecting portion 22 is provided so as to be separated from the receiving side body 21, and the connecting portion 22 may be configured so as to be integrally formed with the receiving side body 21.

The ferrule pressing part 30 is attached to the ferrule receiving part 20, so that the ferrule 10 is pressed toward the ferrule receiving part 20 side from the other end part side. The ferrule pressing part 30 is provided with, for example, a pressing side body 31, a ferrule base 32, an urging member 33, and a fixture 34. The pressing side body 31 is a cylindrical member having an outer diameter larger than the ferrule receiving part 20, and in its inside, the ferrule base 32, the urging member 33 and the fixture 34 are accommodated.

The pressing side body 31 is a high heat resistance member made of, e.g., a nickel-base superalloy, and has a configuration integrally provided with a first cylindrical portion 311 and a second cylindrical portion 312. In the first cylindrical portion 311, the ferrule base 32, the urging member 33, and the fixture 34 are accommodated in this order from the second cylindrical portion 312 side. In the peripheral surface of the first cylindrical portion 311, a plurality of small holes 313 are formed. With this, the mass of the ferrule pressing part 30 can be reduced and the thermal capacity can be reduced. Further, knurling is formed on the peripheral surface of the first cylindrical portion 311, so that the turning force by an operator's fingers can be readily transmitted.

The second cylindrical portion 312 is small in diameter than the first cylindrical portion 311, and is connected to the ferrule receiving part 20 at the time of final tightening. The second cylindrical portion 312 is provided with a pair of guide grooves 314 for guiding the pair of pins 221 formed at the connecting portion 22 of the ferrule receiving part 20. Each guide groove 314 has approximately the same width as the outer diameter of each pin 221, so that pressing of the ferrule pressing part 30 toward the ferrule receiving part 20 side while guiding each pin 221 along each guide groove 314 results in a mutual connection of the ferrule receiving part 20 and the ferrule pressing part 30.

The pin 221 and the guide groove 314, which are engaged with each other, are not limited to be configured such that a pair of pins and a pair of guide grooves are provided, but it may be configured such that one pin and one guide groove are provided, or that three or more pins and three of more guide grooves are provided. Further, it may be configured such that the pin 221 is provided at the ferrule pressing part 30 side and the guide groove 314 is provided at the ferrule receiving part 20 side. Further, the pressing side body 31 is not limited to a configuration in which the first cylindrical portion 311 and the second cylindrical portion 312 different in outer diameter are integrally provided. For example, the pressing side body 31 may be configured by one cylindrical portion having a uniform outer diameter, or may be configured such that three or more cylindrical portions different in outer diameter are integrally provided.

In the ferrule base 32, a pressing surface 321 for pressing the ferrule 10 is formed. The pressing surface 321 is a flat surface perpendicular to the axis line direction (insertion direction of the column 2) of the ferrule receiving part 20 and the ferrule pressing part 30, and a through-hole 322 for inserting a column 2 is formed at the center portion of the pressing surface 321. The through-hole 322 is formed into a tapered shape so as to expand to a side opposite to the pressing surface 321 side to thereby have a shape capable of allowing an easy insertion of the column 2 into the ferrule base 32.

Around the through-hole 322 on the pressing surface 321, an annular protrusion 323 having an inner diameter slightly larger than the outer diameter of the other end part side (pressing plate 321 side) of the ferrule 10. At the time of the final tightening, the other end portion of the ferrule 10 is positioned in a state in which the other end portion of the ferrule 10 is accommodated in the annular protrusion 323. As described above, the ferrule 10 is positioned by the accommodation recess 212 of the ferrule receiving part 20 side and the annular protrusion 323 of the ferrule pressing part 30 side, so that the one end part side of the ferrule 10 can be assuredly brought into contact with the stepped portion 213.

The urging member 33 is configured by, for example, a compression spring, and arranged so as to extend in the axis line direction of the ferrule receiving part 20 and the ferrule pressing part 30. One end face of the urging member 33 is in contact with the rear surface (surface opposite to the pressing surface 321 side) of the ferrule base 32. On the other hand, the other surface of the urging member 33 is in contact with the fixture 34 at the end portion of the first cylindrical portion 311. The fixture 34 is configured by, for example, a C-shaped retaining ring, and is fixed to the end portion of the first cylindrical portion 311 in a state in which an urging force of a certain degree is urged in the urging member 33. The urging member 33 is not limited to a compression spring, and may be configured by other elastic members, such as, e.g., a rubber, or may be configured by a member other than an elastic member.

When performing the final tightening, in a state in which the ferrule 10 is arranged on the pressing surface 321 of the ferrule base 32, the ferrule pressing part 30 is approached to the ferrule receiving part 20 to position the ferrule 10 in the accommodation recess 212. From this state, the ferrule pressing part 30 is pressed toward the ferrule receiving part 20 side against the urging force of the urging member 33 to thereby engage the pins 221 and the guide grooves 314. As a result, the ferrule 10 is pressed from the other end part side toward the ferrule receiving part 20 side. In a state in which the ferrule pressing part 30 is attached to the ferrule receiving part 20, the ferrule 10 is sandwiched between the ferrule receiving part 20 and the ferrule pressing part 30 and fixed thereto.

In this embodiment, in a state in which the ferrule 10 is sandwiched and fixed between the ferrule receiving part 20 and the ferrule pressing part 30, the ferrule 10 is urged toward the ferrule receiving part 20 side by the urging member 33. For this reason, without configuring such that the ferrule pressing part is screwed in the ferrule receiving part by rotating several times, the ferrule 10 can be pressed toward the ferrule receiving part 20 side by a sufficient pressing force by the urging force of the urging member 33. Therefore, the attaching work of the column 2 can be performed more easily.

Further, by configuring such that the ferrule 10 is urged toward the ferrule receiving part 20 side with the urging member 33, the installation error of the ferrule pressing part 30 to the ferrule receiving part 20 can be absorbed by the urging member 33. Therefore, variation of the pressing force to the ferrule 10 is less likely to occur.

Especially, in the present embodiment, due to the engagement of the pin 221 and the guide groove 314, the ferrule receiving part 20 and the ferrule pressing part 30 are mutually attached, and the ferrule 10 can be fixed by being sandwiched between the ferrule receiving part 20 and the ferrule pressing part 30. Therefore, without configuring such that the ferrule pressing part is screwed in the ferrule receiving part by rotating several times, the ferrule pressing part 30 can be attached to the ferrule receiving part 20 by one-touch operation by simply guiding the pin 221 along the guide groove 314. Therefore, the attaching work of the column 2 can be performed more easily.

Further, like the aforementioned screw type column-attaching device, it is not hard for an operator to grasp how many turns the ferrule pressing part should be rotated. For this reason, the attaching work of the column 2 to the column-attaching device 1 is more easy and variation of the pressing forces to the ferrule 10 is less likely to occur.

Figure 4A:
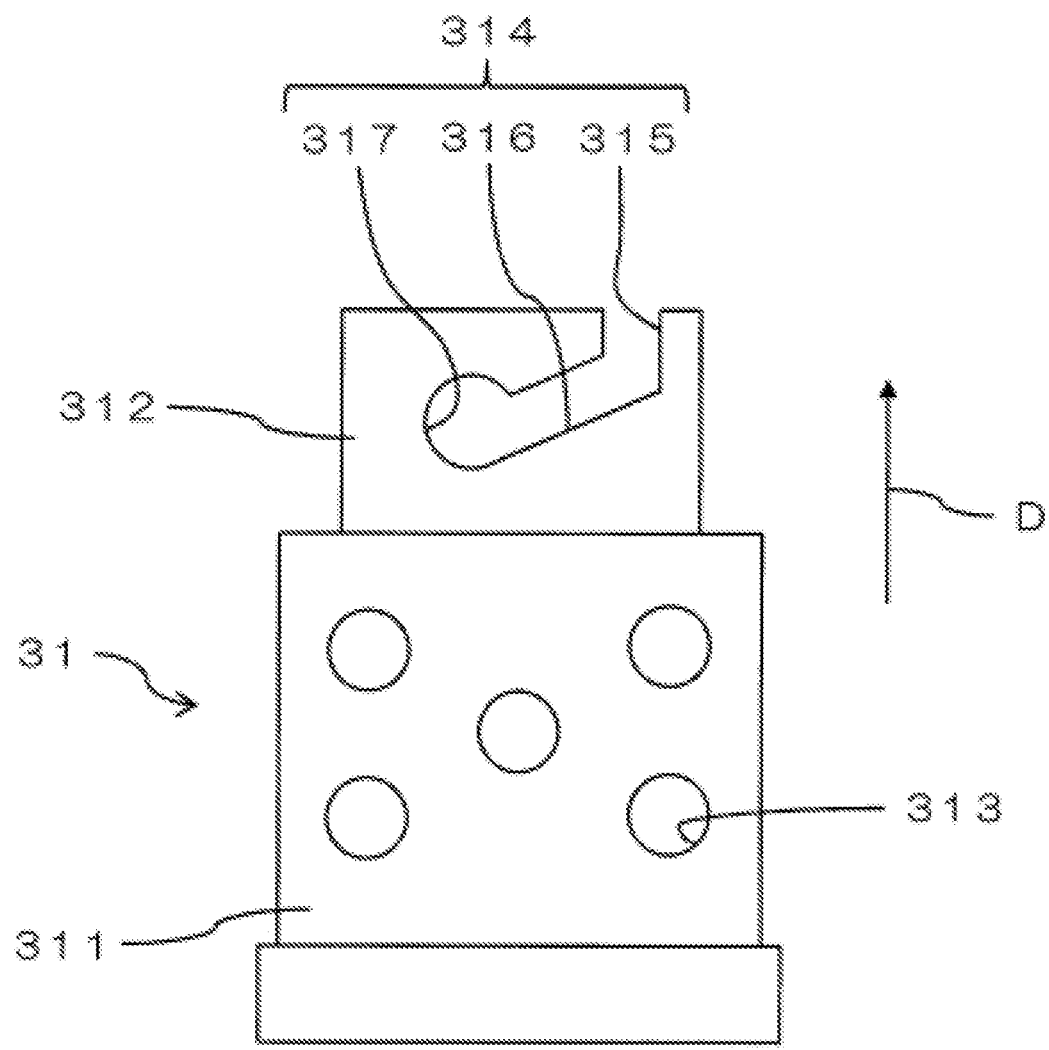
FIG. 4A is a front view showing a configuration example of a pressing side body.

FIG. 4A is a front view showing a configuration example of the pressing side body 31. In this example, the guide groove 314 formed in the second cylindrical portion 312 of the pressing side body 31 includes an introduction groove 315, an inclined groove 316, and an engaging groove 317. The guide groove 314 is configured by a cutout formed at the end face of one end portion of the pressing side body 31, and the introduction groove 315, the inclined groove 316, and the engaging groove 317 are communicated in this order.

The introduction groove 315 extends from the end face of one end portion of the pressing side body 31 in parallel to the axis direction of the pressing side body 31. The inclined groove 316 extends in a direction inclined with respect to the introduction groove 315, i.e., in a direction inclined with respect to the pressing direction D of the ferrule pressing part 30 toward the ferrule receiving part 20 side.

The engaging groove 317 is formed at an end portion of the inclined groove 316 opposite to the introduction groove 315 side, and prevents dropping of the pin 221 from the guide groove 314 by engaging the pin 221 guided along the inclined groove 316 with the urging force of the urging member 33. In this example, it is configured such that the engaging groove 317 is formed into a shape dented in the pressing direction D of the ferrule pressing part 30 from the boundary portion to the inclined groove 316 so that the pin 221 is not pulled out of the engaging groove 317 by being engaged with the boundary portion.

At the time of performing the final tightening, when the ferrule pressing part 30 is pressed toward the ferrule receiving part 20 side against the urging force of the urging member 33, the pin 221 is introduced in the guide groove 314 along the introduction groove 315. Thereafter, by pressing the ferrule pressing part 30 while rotating it so that the pin 221 is guided along the inclined groove 316, the ferrule 10 is pressed on the ferrule receiving part 20 side. By pressing the ferrule pressing part 30 until the pin 221 is engaged with the engaging groove 317, the ferrule pressing part 30 is attached to the ferrule receiving part 20, so that the ferrule 10 is sandwiched between the ferrule receiving part 20 and the ferrule pressing part 30 and fixed thereto.

Figure 4B:
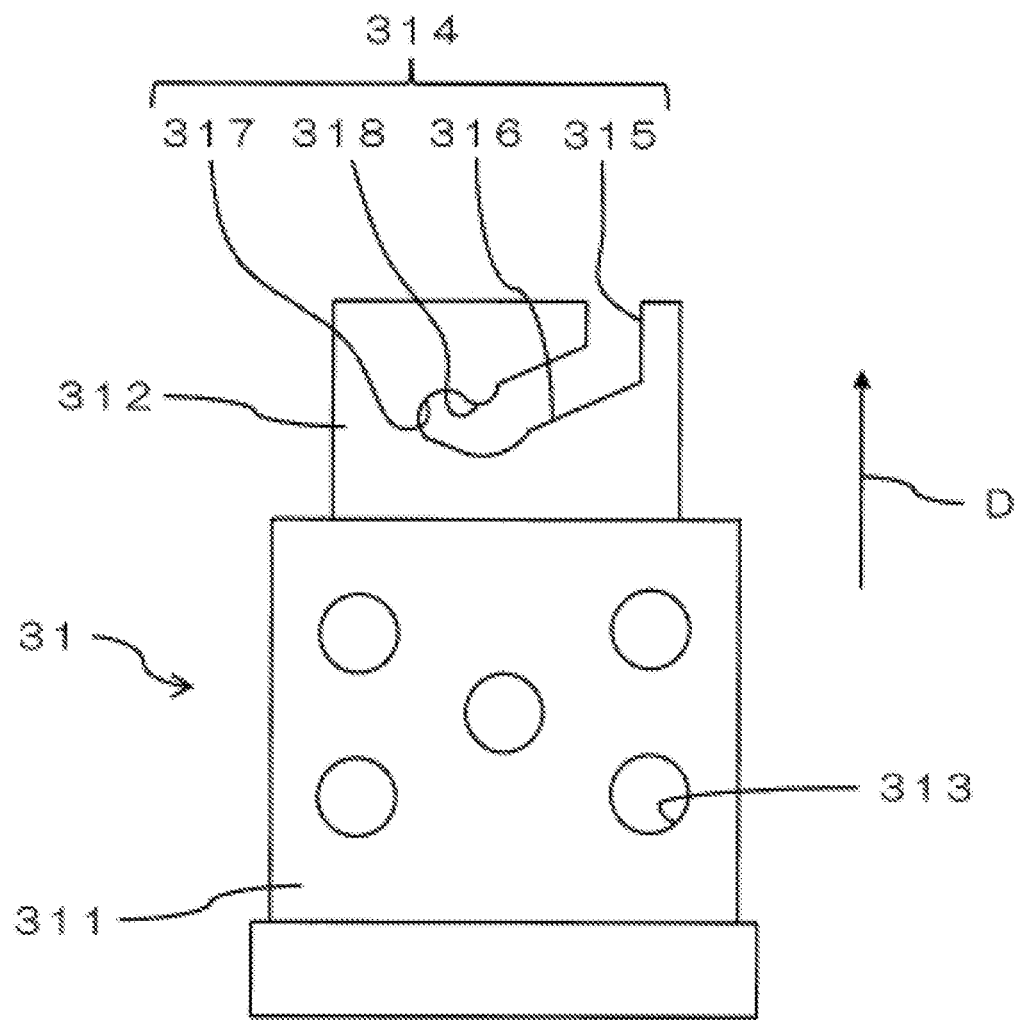
FIG. 4B is a front view showing another configuration example of a pressing side body.

FIG. 4B is a front view showing another configuration example of the pressing side body 31. In this example, in the same manner as the example shown in FIG. 4A, the guide groove 314 includes the introduction groove 315, the inclined groove 316, and the engaging groove 317, but differs in that a protruded portion 318 is formed at the boundary portion between the inclined groove 316 and the engaging groove 317. As for the configuration of the introduction groove 315 and the inclined groove 316, the configuration is the same as the example shown in FIG. 4A, and therefore the detail description will be omitted.

The protruded portion 318 is protruded in a direction opposite to the pressing direction D of the ferrule pressing part 30. With this, the pin 221 guided along the inclined groove 316 rides over the protruded portion 318 and then is engaged with the engaging groove 317, so that the pin 221 is prevented from being dropped from the guide groove 314 with the urging force of the urging member 33. The final tightening operation is the same as in the case shown in FIG. 4A.

According to the configuration as exemplified in FIG. 4A and FIG. 4B, by simply guiding the pin 221 along the inclined groove 316 extending in a direction inclined to the pressing direction D of the ferrule pressing part 30, the ferrule pressing part 30 can be attached to the ferrule receiving part 20 by one-touch operation. At this time, by guiding the pin 221 along the inclined groove 316, the ferrule 10 can be gradually pressed toward the ferrule receiving part 20 side. Therefore, by appropriately setting the inclination angle of the inclined groove 316, the operability at the time of attachment can be improved.

Further, by guiding the pin 221 along the inclined groove 316 to gradually press the ferrule 10 toward the ferrule receiving part 20 side and then engaging the pin 221 with the engaging groove 317, the ferrule 10 can be fixed with a constant pressing force. Therefore, variation of the pressing force to the ferrule 10 is less likely to occur and an operator can get a clicking feeling when the pin 221 is engaged with the engaging groove 317, which can improve the operability at the time of the attachment.

It should be noted that the shape of the guide groove 314 is not limited to the shape as shown in FIG. 4A or FIG. 4B, and any arbitrary shape may be employed. That is, the shapes of the introduction groove 315, the inclined groove 316, and the engaging groove 317 are not limited to the shapes shown in FIG. 4A or FIG. 4B. Further, the guide groove 314 is not limited to have a configuration equipped with the introduction groove 315, the inclined groove 316, and the engaging groove 317, and may be configured to equip another groove.

Figure 5A:
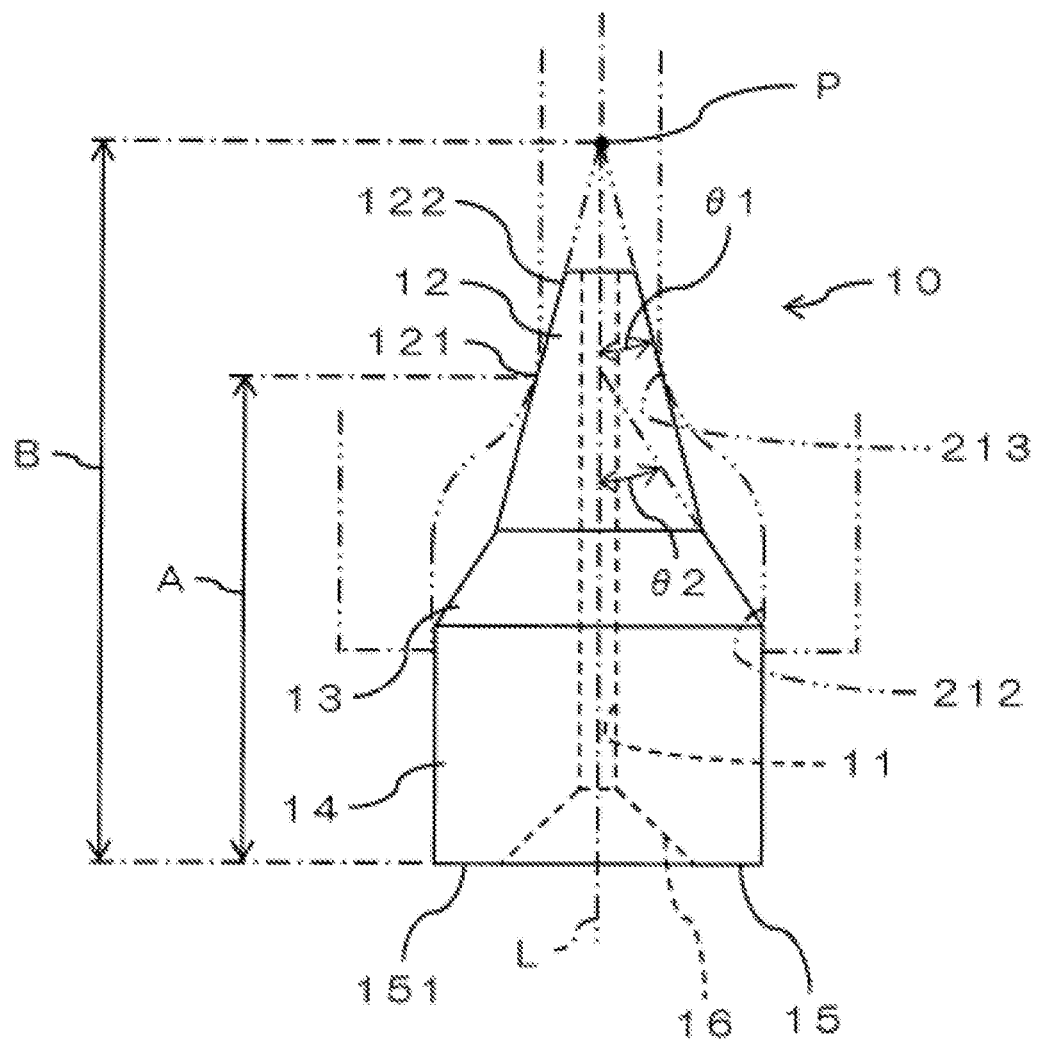
FIG. 5A is a front view showing a configuration example of a ferrule included in the ferrule set according to one embodiment of the present invention.
Figure 5B:
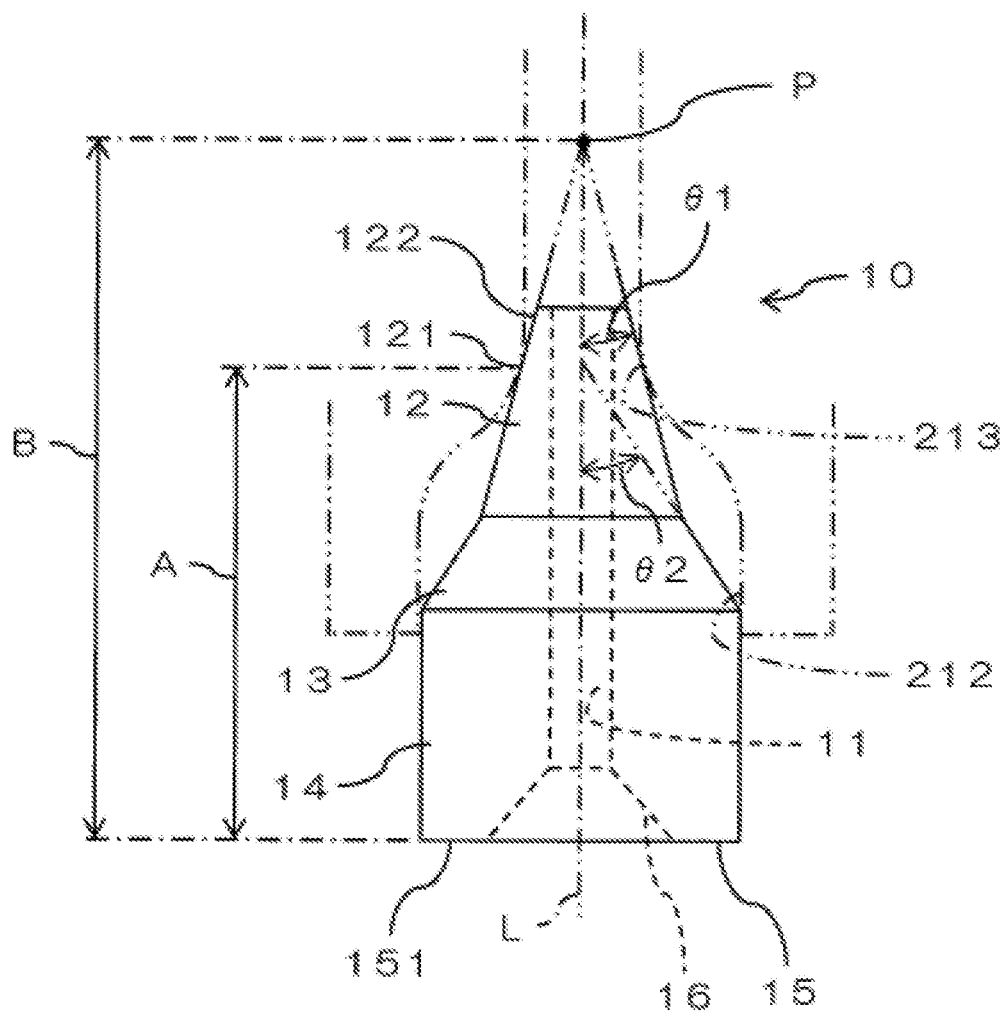
FIG. 5B is a front view showing a configuration example of a ferrule included in the ferrule set according to one embodiment of the present invention.

FIG. 5A and FIG. 5B each are a front view showing a configuration example of a ferrule 10 included in the ferrule set according to one embodiment of the present invention. Ferrules 10 shown in FIG. 5A and FIG. 5B are to be attached to columns 2 different in outer diameter, and therefore have shapes different from each other. These ferrules 10 are used for a common column-attaching device 1 as illustrated in FIGS. 2 and 3.

The ferrules 10 shown in FIG. 5A and FIG. 5B each are a cylindrical member in which an insertion hole 11 for inserting a column 2 along the center axis line L is formed. The insertion hole 11 of each ferrule 10 has an inner diameter corresponding to the outer diameter of the column 2 to be inserted in each ferrule 10, and is configured to allow an insertion of a column 2 in the insertion hole 11 with a certain gap.

On the outer peripheral surface of each ferrule 10, for example, a first tapered surface 12, a second tapered surface 13, and a cylindrical surface 14 are coaxially formed. The contact region to the stepped portion 213 in the first tapered surface 12 configures a receiving side contact portion 121 received by the ferrule receiving part 20. Further, the end face 15 of each ferrule 10 on the cylindrical surface 14 side comes into contact with the pressing surface 321 of the ferrule base 32 and configures a pressing side contact portion 151 to be pressed by the ferrule pressing part 30.

The first tapered surface 12 is formed into a tapered shape in which the first tapered surface 12 is inclined to the center axis line L and the outer diameter gradually decreases from the second tapered surface 13 side toward the tip end side. At the tip end part of the first tapered surface 12, a swaging part 122 to be swaged at the time of attaching the ferrule 10 to the column 2 is formed. As described above, the position at which the ferrule 10 is received by the ferrule receiving part 20 (receiving side contact portion 121) and the position at which the ferrule 10 is swaged (swaging part 122) are set at different positions.

With this, the ferrule 10 is pressed toward the ferrule receiving part 20 side by the ferrule pressing part 30 in a state in which the ferrule 10 is received by the ferrule receiving part 20 at a position different from the swaged position. The swaged position of the ferrule 10 is unstable in shape, and therefore, by receiving the ferrule 10 by the ferrule receiving part 20 at a position different from the swaged position, variation of the pressing force to the ferrule 10 is less likely to occur. Especially, like this embodiment, according to the configuration in which the stepped portion 213 for receiving the ferrule 10 is formed by a curved surface, positional variation of the swaging part 122 is likely to occur. Therefore, by providing the receiving side contact portion 121 at a position different from the swaging part 122, occurrence of variation of the pressing force to the ferrule 10 can be effectively prevented.

As shown in FIG. 5A and FIG. 5B, the first tapered surfaces 12 of the ferrules 10 each are a tapered surface having the same inclination angle θ1 formed such that the extension line of the tapered surface intersects at a common point P and having a shape in which the tapered surface is cut at a position depending on the inner diameter of the insertion hole 11 through which a column 2 is inserted. That is, the first tapered surface 12 is formed into a tapered surface cut at a position corresponding to the inner diameter of the insertion hole 11 so that a torque for swaging the swaging part 122 formed at one end portion (the tip end part of the first tapered surface 12) of each ferrule 10 becomes approximately constant.

As described above, the position of the swaging part 122 differs depending on a ferrule 10, however, in this embodiment, a distance A between the receiving side contact portion 121 and the pressing side contact portion 151 is the same in each ferrule 10. With this, even in cases where either ferrule 10 is sandwiched between the ferrule receiving part 20 and the ferrule pressing part 30 and fixed thereto, the ferrule 10 can be fixed with a constant pressing force. Therefore, variation of the pressing force to the ferrule 10 is less likely to occur. As to a distance B between the aforementioned point P and the pressing side contact portion 151, the distance is the same in each ferrule 10.

In this embodiment, the length of the first tapered surface 12 in the center axis line L direction differs depending on the outer diameter of a column 2 to be inserted in each ferrule 10. Even in such a case, since the inclination angle θ1 of the first tapered surface 12 to the center axis line L is the same in each ferrule, the shape of the tip end part of the first tapered surface 12 becomes the same in each ferrule 10.

Accordingly, since the thickness of the tip end part of the ferrule 10 and the gap between the column 2 and the ferrule 10 are constant regardless of the outer diameter of the column 2 to be used, a ferrule 10 can be attached to a column 2 by swaging the ferrule 10 with the same torque. As a result, the attaching work of the column 2 can be performed more easily. When attaching each ferrule 10 to a column 2 by swaging the ferrule 10, for example, by using a ferrule swaging tool equipped with a torque limiter, it is possible to swage the ferrule 10 always with the same torque.

The second tapered surface 13 is formed at at least a part between the receiving side contact portion 121 and the pressing side contact portion 151, and the inclination angle θ2 to the center axis line L is larger than the inclination angle of the first tapered surface 12. Therefore, by providing the second tapered surface 13 having the inclination angle θ2 larger than the first tapered surface 12 while setting the inclination angle θ1 of the first tapered surface 12 to an angle suitable for swaging, the length of the ferrule 10 along the center axis line L can be made shorter.

Further, at the time of sandwiching each ferrule 10 between the ferrule receiving part 20 and the ferrule pressing part 30, by making the second tapered surface 13 act as a guide, each ferrule 10 can be smoothly arranged at the attachment position. That is, even in cases where the ferrule 10 is inserted obliquely when being accommodated in the accommodation recess 212, the ferrule 10 can be favorably guided to the inside of the accommodation recess 212 by making the second tapered surface 13 slide on the accommodation recess 212. Therefore, the attaching work of the column 2 can be performed more easily.

The cylindrical surface 14 has an uniform outer diameter along the center axis line L of the ferrule 10. In this embodiment, the outer diameter of the cylindrical surface 14 is formed to be equal in each ferrule 10, so that each ferrule 10 can be positioned to a common accommodation recess 212.

At the end face 15 of each ferrule 10 on the cylindrical surface 14 side, a conically-shaped dent 16 is formed so as to expand larger than the outer diameter of the column 2 to be inserted into the ferrule 10. The insertion hole 11 is expanded by the dent 16 toward the end face 15 side, so that the column 2 is inserted into each ferrule 10 from the end face 15 side via the dent 16. With this, since the column 2 can be smoothly guided into each ferrule 10, the attaching work of the column 2 can be performed more easily.

The shape of each ferrule 10 is not limited to the shapes as shown in FIG. 5A and FIG. 5B, and any arbitrary shape may be employed. In other words, the shapes of the first tapered surface 12, the second tapered surface 13, and the cylindrical surface 14 are not limited to the shapes as shown in FIG. 5A and FIG. 5B. Also, as to the shape of the insertion hole 11, it is not limited to a configuration of having an uniform inner diameter along the center axis line L, but it may be configured such that two or more insertion holes 11 different in inner diameter are communicated when the outer diameter of the column 2 is small, for example.

Further, each ferrule 10 is not limited to have a configuration equipped with the first tapered surface 12, the second tapered surface 13, and the cylindrical surface 14, and may be configured not to equip at least one of them or to equip another surface. Further, in the examples shown in FIG. 5A and FIG. 5B, although the descriptions are directed to two types of ferrules 10, the ferrule set according to the present invention is not limited to a ferrule set including two types of ferrules 10, but may be a ferrule set including three or more types of ferrules 10.

Figure 6:
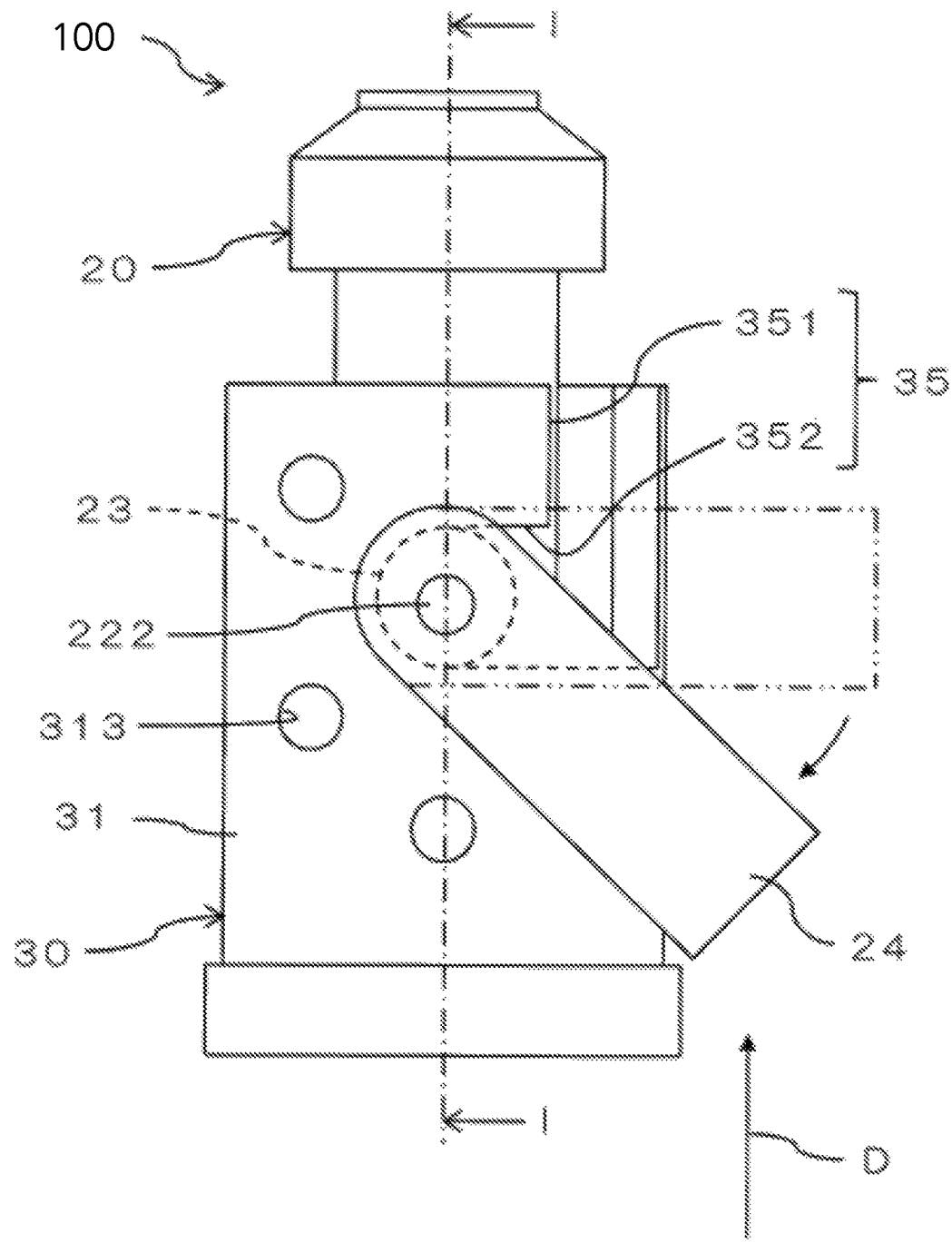
FIG. 6 is a side view showing a configuration example of a column-attaching device according to a second embodiment of the present invention.
Figure 7:
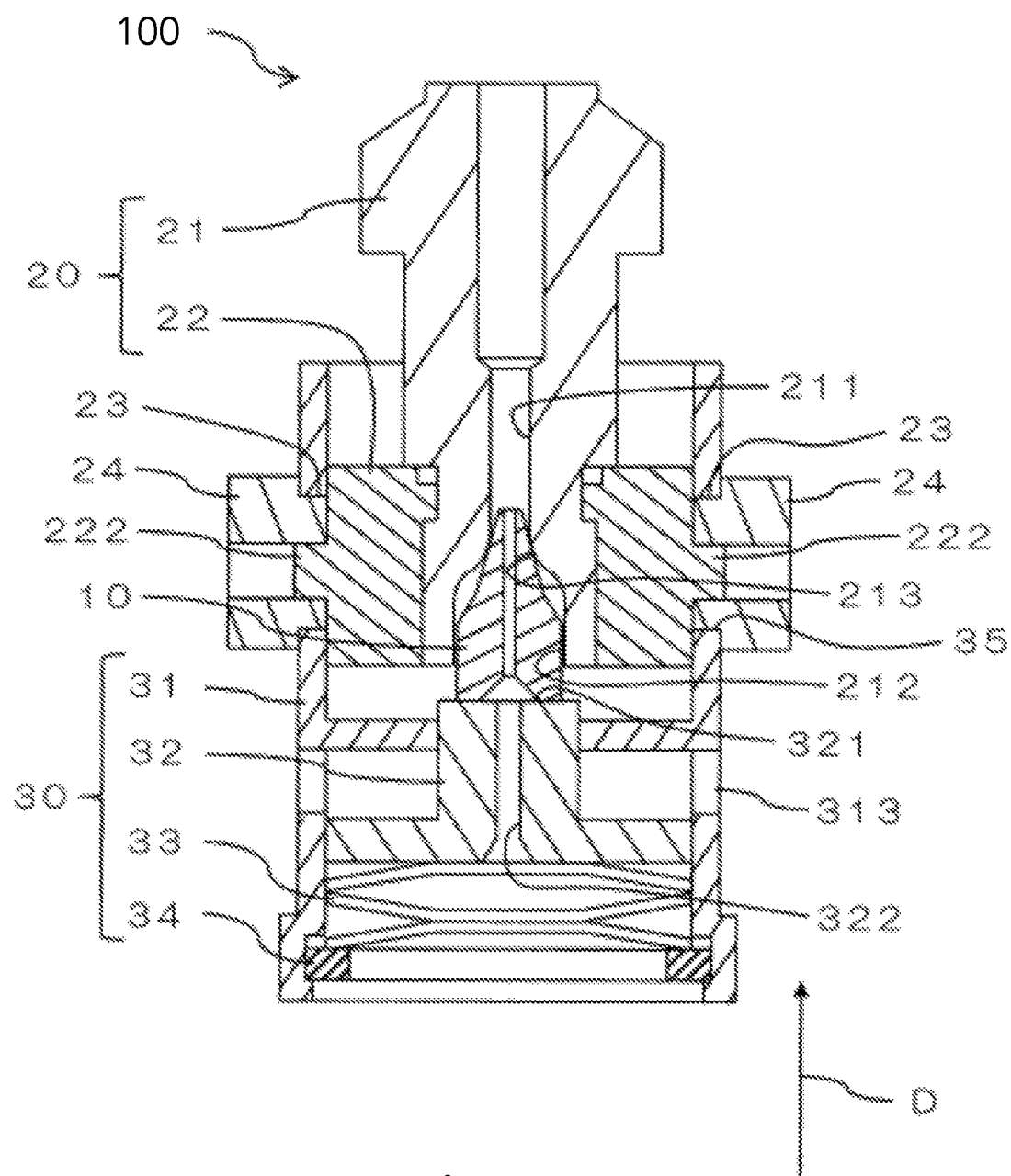
FIG. 7 is a I-I cross-sectional view of the column-attaching device shown in FIG. 6.

FIG. 6 is a side view showing a configuration example of a column-attaching device 100 according to a second embodiment of the present invention. Further, FIG. 7 is a I-I cross-sectional view of the column-attaching device 100 shown in FIG. 6. The column-attaching device 100 according to the second embodiment is, in the same manner as in the column-attaching device 1 of the first embodiment, provided with a ferrule 10, a ferrule receiving part 20, and a ferrule pressing part 30.

In the aforementioned first embodiment, the description is directed to the configuration in which the ferrule pressing part 30 is attached to the ferrule receiving part 20 by the engagement of the pin 221 and the guide groove 314. On the other hand, in the second embodiment, it is configured such that the ferrule pressing part 30 is attached to the ferrule receiving part 20 by the rotation of the cam 23. In the second embodiment, as to the same configuration as in the first embodiment, the detail description will be omitted by allotting the same symbol in the figure.

The cam 23 is provided at the ferrule receiving part 20. More specifically, the cam 23 is rotatably attached to the connecting portion 22 of the ferrule receiving part 20. On the outer peripheral surface of the connecting portion 22, a pair of shaft portions 222 protruded in the radial direction of the connecting portion 22 are formed, so that a pair of cams 23 is rotatably attached to the pair of shaft portions 222. The cam 23 is, for example, an eccentric cam, and is rotatably attached at an eccentric position with respect to the center.

The pressing side body 31 of the ferrule pressing part 30 is a cylindrical member, and a ferrule receiving part 20 is inserted at the one end part side of the cylindrical member. On the other end part side of the pressing side body 31, in the same manner as in the first embodiment, the ferrule base 32, the urging member 33, and the fixture 34 are accommodated, so that the ferrule base 32 is urged toward one end part side (ferrule receiving part 20 side) of the pressing side body 31 by the urging member 33.

In this embodiment, the urging member 33 is configured by, for example, a disk spring, and a plurality of disk springs are arranged in a stacked manner along the axis line direction of the ferrule receiving part 20 and the ferrule pressing part 30. The urging member 33 is not limited to a disk spring, and may be configured by other elastic members, such as, e.g., a rubber, or may be configured by a member other than an elastic member.

At one end portion of the pressing side body 31, a pair of guide grooves 35 for guiding the cams 23 are formed. Each guide groove 35 has approximately the same width as the outer diameter of each cam 23, so that pressing of the ferrule pressing part 30 into the ferrule receiving part 20 side while guiding each cam 23 along each guide groove 35 results in an engagement of the ferrule pressing part 30 with the ferrule receiving part 20.

The guide groove 35 has, for example, an introduction groove 351 and an engaging groove 352. The guide groove 35 is configured by a cutout formed at the end face of one end portion of the pressing side body 31. The introduction groove 351 and the engaging groove 352 are communicated in this order. The introduction groove 351 extends from the end face of one end portion of the pressing side body 31 in parallel to the axis direction of the pressing side body 31. The engaging groove 352 extends in a direction perpendicular to the introduction groove 351, i.e., in a direction perpendicular to the pressing direction D of the ferrule pressing part 30 toward the ferrule receiving part 20 side.

At the time of performing the final tightening, when the ferrule pressing part 30 is pressed toward the ferrule receiving part 20 side against the urging force of the urging member 33, the cam 23 is introduced in the guide groove 35 along the introduction groove 351. Thereafter, by rotating the ferrule pressing part 30, the cam 23 is guided along the engaging groove 352, and it becomes a state in which the cam 23 is engaged with the engaging groove 352.

In a state in which the cam 23 is engaged with the engaging groove 352, the final tightening has not been completed. From this state, when the cam 23 is rotated centering on the shaft portion 222, a pressing force acts on the engaging groove 352 in the pressing direction D, which results in further pressing of the ferrule pressing part 30 toward the ferrule receiving part 20 side against the urging force of the urging member 33. With this, the ferrule pressing part 30 is attached to the ferrule receiving part 20, the ferrule 10 is sandwiched between the ferrule receiving part 20 and the ferrule pressing part 30 and fixed thereto.

As described above, in this embodiment, without configuring such that the ferrule pressing part is screwed in the ferrule receiving part by rotating several times, the ferrule pressing part 30 can be attached to the ferrule receiving part 20 by one-touch operation by simply rotating the cam 23. Therefore, the attaching work of the column 2 can be performed more easily. At this time, by rotating the cam 23, the ferrule 10 can be gradually pressed toward the ferrule receiving part 20 side. Therefore, by appropriately setting the surface shape of the cam 23, the operability at the time of attachment can be improved.

Further, like the aforementioned screw type column-attaching device, it is not hard for an operator to grasp how many turns the ferrule pressing part should be rotated. For this reason, the attaching work of the column 2 to the column-attaching device 100 is more easy and variation of the pressing force to the ferrule 10 is less likely to occur.

Further, in this embodiment, even if it is configured such that the ferrule pressing part 30 can be attached to the ferrule receiving part 20 by one-touch operation, the ferrule 10 can be pressed toward the ferrule receiving part 20 side with the urging force of the urging member 33. Further, by configuring such that the ferrule 10 is urged toward the ferrule receiving part 20 side with the urging member 33, the installation error of the ferrule pressing part 30 to the ferrule receiving part 20 can be absorbed by the urging member 33. Therefore, variation of the pressing force to the ferrule 10 is less likely to occur.

To the pair of cams 23, for example, a common lever 24 is connected. An operator can rotate the pair of cams 23 by engaging the cams 23 with the engaging grooves 352 with the pressing side body 31 of the ferrule pressing part 30 gripped, and then operating the lever 24. As mentioned above, a simple operation of the lever 24 allows the simultaneously rotation of the pair of cams 23, which can improve the operability at the time of the attachment.

It is not limited to be configured such that a pair of cams 23 are provided at the ferrule receiving part 20, and it may be configured such that only one cam 23 is provided, or that three or more cams 23 are provided. Furthermore, it may be configured such that the cam 23 is provided not at the ferrule receiving part 20, but at the ferrule pressing part 30, or may be configured such that cams 23 are provided at both of the ferrule receiving part 20 and the ferrule pressing part 30.

Further, the ferrule pressing part 30 is not limited to the configuration in which the urging member 33 is provided. That is, it may be configured such that the urging member 33 is omitted and that the ferrule 10 is pressed toward the ferrule receiving part 20 side only with the pressing force by, for example, the cam 23.

In the aforementioned embodiments, the description is directed to the configuration in which the ferrule receiving part 20 is provided with the receiving side body 21 and the connecting portion 22. However, it is not limited to such a configuration, and may be a configuration in which the ferrule receiving part 20 is provided with other members, or a configuration in which some of the aforementioned members are not provided.

Further, in the aforementioned embodiments, the description is directed to the configuration in which the ferrule pressing part 30 is provided with the pressing side body 31, the ferrule base 32, the urging member 33, and the fixture 34. However, it is not limited to such a configuration, and may be a configuration in which the ferrule pressing part 30 is provided with other members, or a configuration in which some of the aforementioned members are not provided.

DESCRIPTION OF SYMBOLS 1 column-attaching device
2 column
3 column oven
4 sample introduction part
5 detector
6 carrier gas supply path
7 sample vaporization chamber
8 sample inlet
10 ferrule
11 insertion hole
12 first tapered surface
13 second tapered surface
14 cylindrical surface
15 end face
20 ferrule receiving part
21 receiving side body
22 connecting portion
23 cam
24 lever
30 ferrule pressing part
31 pressing side body
32 ferrule base
33 urging member
34 fixture
35 guide groove
100 column-attaching device
121 receiving side contact portion
122 swaging part
151 pressing side contact portion
211 through-hole
212 accommodation recess
213 stepped portion
221 pin
222 shaft portion
311 first cylindrical portion
312 second cylindrical portion
313 small hole
314 guide groove
315 introduction groove
316 inclined groove
317 engaging groove
318 protruded portion
321 pressing surface
322 through-hole
323 annular protrusion
351 introduction groove
352 engaging groove

The invention claimed is:

1. A system including a column-attaching device and a ferrule set including plural types of ferrules for use in the column-attaching device, the column-attaching device being configured to attach a column to an attachment position, the column-attaching device comprising:
    a ferrule configured to be attached to the column by being inserted by the column and swaged at one end part side of the ferrule;
    a ferrule receiving part configured to receive the one end part side of the ferrule; and
    a ferrule pressing part configured to be attached to the ferrule receiving part and fix the ferrule by pressing the ferrule from the other end part side of the ferrule toward the ferrule receiving part side to sandwich the ferrule between the ferrule pressing part and the ferrule receiving part,
    wherein the ferrule pressing part includes an urging member for urging the ferrule toward the ferrule receiving part side,
    wherein each ferrule of the ferrule set is provided with a receiving side contact portion to be received by the ferrule receiving part and a pressing side contact portion to be pressed by the ferrule pressing part, and
    wherein a distance between the receiving side contact portion and the pressing side contact portion is the same in each ferrule of the ferrule set.

2. The system according to claim 1,
    wherein each ferrule of the ferrule set is provided with an insertion hole having an inner diameter corresponding to an outer diameter of a column to be inserted and extending along a center axis line and a first conical surface inclined to the center axis line and having the receiving side contact portion, and
    wherein an inclination angle of the first conical surface to the center axis line is the same in each ferrule of the ferrule set and a length of the first conical surface in a center axis line direction differs depending on the outer diameter of the column to be inserted in each ferrule of the ferrule set.

3. The system according to claim 2,
    wherein in each ferrule of the ferrule set, a second conical surface having an inclination angle to the center axis line larger than the inclination angle of the first conical surface is formed at at least a part between the receiving side contact portion and the pressing side contact portion.

4. The system according to claim 1, wherein each ferrule of the ferrule set has an end face configuring the pressing side contact portion, and wherein a conically-shaped dent is formed at the end face so as to expand to be larger than an outer diameter of a column to be inserted, so that the column is inserted into each ferrule of the ferrule set via the conically-shaped dent.

* * * * *